(12) United States Patent
Lim et al.

(10) Patent No.: US 7,529,813 B2
(45) Date of Patent: May 5, 2009

(54) MULTIMEDIA TRANSFER FOR WIRELESS NETWORK

(75) Inventors: Sharon Lim, Plano, TX (US); Joonatan Henriksson, Espoo (FI)

(73) Assignee: Hewlett-Packard Development Company, L.P., Houston, TX (US)

( * ) Notice: Subject to any disclaimer, the term of this patent is extended or adjusted under 35 U.S.C. 154(b) by 467 days.

(21) Appl. No.: 11/107,140

(22) Filed: Apr. 14, 2005

(65) Prior Publication Data

US 2006/0253873 A1 Nov. 9, 2006

(51) Int. Cl.
*G06F 15/16* (2006.01)
*H04N 7/16* (2006.01)

(52) U.S. Cl. .................... 709/219; 725/62
(58) Field of Classification Search ......... 709/204–207, 709/216–219, 227–232; 455/412.1, 416; 725/62
See application file for complete search history.

(56) References Cited

U.S. PATENT DOCUMENTS

| | | | | |
|---|---|---|---|---|
| 6,950,662 B2* | 9/2005 | Kumar | ............. | 455/456.3 |
| 2005/0213580 A1* | 9/2005 | Mayer et al. | ............. | 370/395.2 |
| 2005/0220041 A1* | 10/2005 | Lin | ............. | 370/278 |
| 2006/0026288 A1* | 2/2006 | Acharya et al. | ............. | 709/227 |
| 2006/0045124 A1* | 3/2006 | Dahlstrom et al. | ............. | 370/465 |
| 2006/0149811 A1* | 7/2006 | Bennett et al. | ............. | 709/203 |

FOREIGN PATENT DOCUMENTS

| | | |
|---|---|---|
| WO | WO2005027460 | 3/2005 |
| WO | WO2005029809 | 3/2005 |

OTHER PUBLICATIONS

ETSI Standards, Sophia-Antipo, FR, Universal Mobile Telecommunications system (UMTS); Messageing using the IP Multimedia (IM) Core Network (CN) subsystem; Stage # (3GPP TS 124.
Schuelke A: "Availability Control Function", Announcement Open Mobile Alliance, XX, XX, Jan. 29, 2004, pp. 1-7, XP002333207, p. 1-p. 7.

* cited by examiner

*Primary Examiner*—Yasin M Barqadle (57) ABSTRACT

A method for transferring a multimedia file from a user's mobile device to user equipment associated with another user is disclosed. The method includes sending an invitation from the user's mobile device to the user equipment to request a transfer of the multimedia file. The method also includes setting up a bearer data channel between the user's mobile device and the equipment to facilitate the transferring of the multimedia file, the transferring is configured to be accomplished using Message Sessions Relay Protocol (MRSP) or Real-Time Transfer Protocol (RTP). The method further includes transferring the multimedia file using the MSRP or RTP and the bearer data channel.

7 Claims, 11 Drawing Sheets

MULTIMEDIA TRANSFER FOR WIRELESS NETWORK

BACKGROUND OF THE INVENTION

The 3GPP (Third Generation Partnership Project, www.3GPP.org) is a collaborative effort to produce technical specifications and proposals for third generation (3G) mobile systems. One of these proposals, the IP Multimedia Subsystem (Internet Protocol Multimedia Subsystems or IMS), is rapidly gaining acceptance by many as the de-facto standard for IP multimedia services for the 3G platform.

One of the key features of IMS is the use of the Session Initiation Protocol (SIP) for call control and signaling functions. SIP pertains to an RFC standard (RFC 3261) from the Internet Engineering Task Force (IETF), the body responsible for administering and developing widely received technical specifications that shape the Internet. SIP is also employed to facilitate the transfer of multimedia files, such as video clips, from one mobile device to another receiving equipment, such as the mobile device of another end user.

To transfer a video clip, a SIP proxy that is set up within the sender's handset is typically employed to send the video clip. For example, if the sender wants to send a video clip to a given recipient, the video clip is first loaded into the memory area of the user's handset. Using the SIP protocol, the SIP proxy therein then sends the video clip to the recipient using the recipient's identity, which is supplied by the sender.

Consider the situation wherein the user wishes to send the same video clip to a group of recipients (one-to-many) instead of to a single recipient (one-to-one). Again, the video clip is loaded into the memory area of the user's handset. The user specifies the identity of each recipient, and the SIP proxy in the user's handset sends the video clip to the recipients, one after another.

Although SIP-based approach accomplishes the one-to-many transfer of the video clip, there are many disadvantages. For example, although many modern handsets provide the ability to specify an address list, the list is typically employed for quick dialing. More specifically, the current address list cannot be employed by the SIP proxy to send the video clip to the members in the address list. Instead, the sender has to specify each recipient manually.

As another example, since the video clip is sent to the recipients one at a time, the bandwidth requirement between the sender's handset and the rest of the network is quite sizable. For example, if the user wishes to send a 5-megabyte video clip to 4 recipients, then approximately 20 megabytes worth of video data will be transmitted from the sender's mobile device. Since the wireless terminal link bandwidth (i.e., the bandwidth between the mobile device and the gateway to the rest of the network) is often the most limiting and expensive, such approach imposes a high bandwidth demand on the network's resources where the resources are most limited. This limitation severely restricts the scalability of the current approach.

As yet another example, the current approach for the one-to-many transfer of multimedia data may cause many of the recipients to receive the video clip minutes or even hours after the'start of video transfer session. For example, if a given recipient is the 10th recipient in the queue to receive the video clip, that given recipient may have to wait for the client application in the sender's handset to finish sending the video clip to the preceding nine recipients before starting to receive the video clip. For some real-time or near-real-time video streaming usage scenarios, the current approach is unsatisfactory since the time delay for recipients at or near the end of the queue would be unduly long.

SUMMARY OF THE INVENTION

The invention relates, in an embodiment, to a method for transferring a multimedia file from a user's mobile device to user equipment associated with another user. The method includes sending an invitation from the user's mobile device to the user equipment to request a transfer of the multimedia file. The method also includes setting up a bearer data channel between the user's mobile device and the equipment to facilitate the transferring of the multimedia file, the transferring is configured to be accomplished using Message Sessions Relay Protocol (MRSP). The method further includes transferring the multimedia file using the MSRP and the bearer data channel.

In another embodiment, the invention relates to a method for transferring a multimedia file from a user's mobile device to a plurality of user equipments associated with a plurality of group members of a group. The method includes obtaining group membership information from a server, the group membership information pertaining to the plurality of group members. The method also includes sending the multimedia file from an application server to at least a subset of the plurality of group members using the group membership information.

In another embodiment, the invention relates to a method for transferring a multimedia file from a user's mobile device to a plurality of user equipments associated with a plurality of group members of a group. The method includes sending a SIP (Session Initiation Protocol) message that includes the multimedia file and that specifies a group recipient to a CSCF (Call Sessions Control Function). The method also includes forwarding the SIP message that includes the multimedia file and that specifies the group recipient to an application server. The method additionally includes obtaining group membership information from a server, the group membership information pertaining to the plurality of group members. The method further includes sending the multimedia file, using SIP, from the application server to at least a subset of the plurality of group members using the group membership information.

In another embodiment, the invention relates to an article of manufacture comprising a program storage medium having computer readable code embodied therein, the computer readable code being configured to transfer a multimedia file from a user's mobile device to a plurality of user equipments associated with a plurality of group members of a group. The medium includes computer readable code for obtaining group membership information from a server, the group membership information pertaining to the plurality of group members. The medium also includes computer readable code for sending the multimedia file from an application server to at least a subset of the plurality of group members using the group membership information.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF VARIOUS EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention also covers articles of manufacture that includes a computer readable medium that stores computer readable instructions for carrying out embodiments of the inventive technique. The computer readable medium may include, for example, semiconductor, magnetic, opto-magnetic, optical, or other forms of computer readable medium for storing computer readable code. Further, the invention also covers apparatuses, such as circuits, dedicated and/or programmable, e.g., to carry out tasks pertaining to embodiments of the invention. Examples of such apparatus include a general purpose computer and/or a dedicated computing device when appropriately programmed and may include a combination of a computer/computing device and dedicated/programmable circuits adapted for the various tasks pertaining to embodiments of the invention.

In accordance with embodiments of the invention, the user may specify that a multimedia file, such as a video clip, be sent to a public or private group, and the request for one-to-many video transfer is handled by an application server in the network, thereby reducing the bandwidth requirement on the part of the sender's mobile device. In the following disclosure, reference is made to video clips and the transfer of video data. However, such reference is made to simplify understanding by discussing consistent examples and/or applications. Embodiments of the invention are applicable to the transfer of any type of data file, and in particular to the transfer of multimedia files, including video, audio, and other types of digital data.

Embodiments of the invention include techniques for ascertaining the presence status of the group members so that video clip may be prioritized for those who are present (e.g., logged on). Those members of the group being not present when the sender requests that the video clip be sent may not be furnished a copy of the video clip or, in an embodiment, may be furnished a copy of the video clip from the application server at a later time.

The video clip may be sent by the application server to each recipient using SIP. Embodiments of the invention further include the use of protocols that render the video transfer process between the application server and the recipients more efficient. These protocols include MSRP (Message Sessions Relay Protocol), RTP (Real-time transport protocol), etc.

Figure 1:
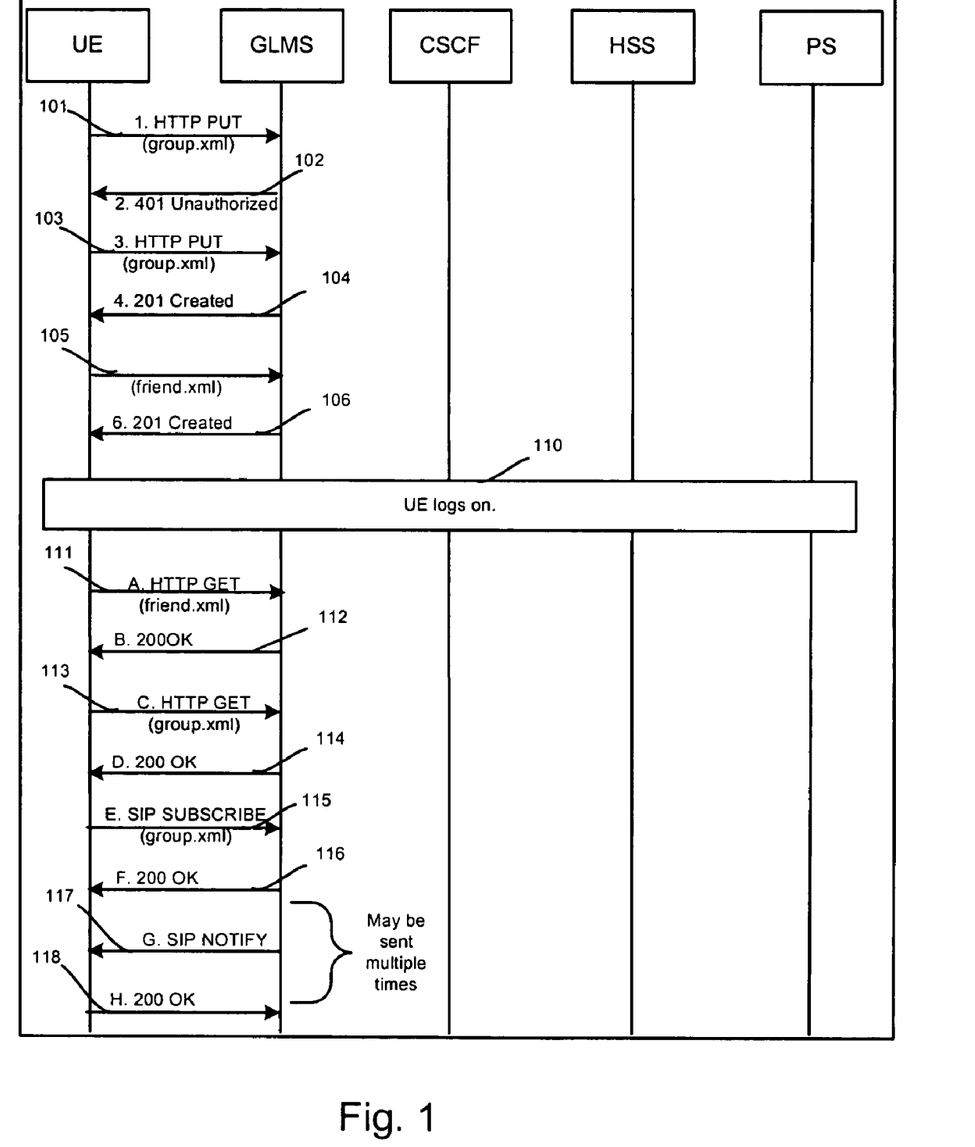
FIG. 1 is an example flow diagram showing the message flows that take place when a cell phone user sets up a group.
Figure 2:
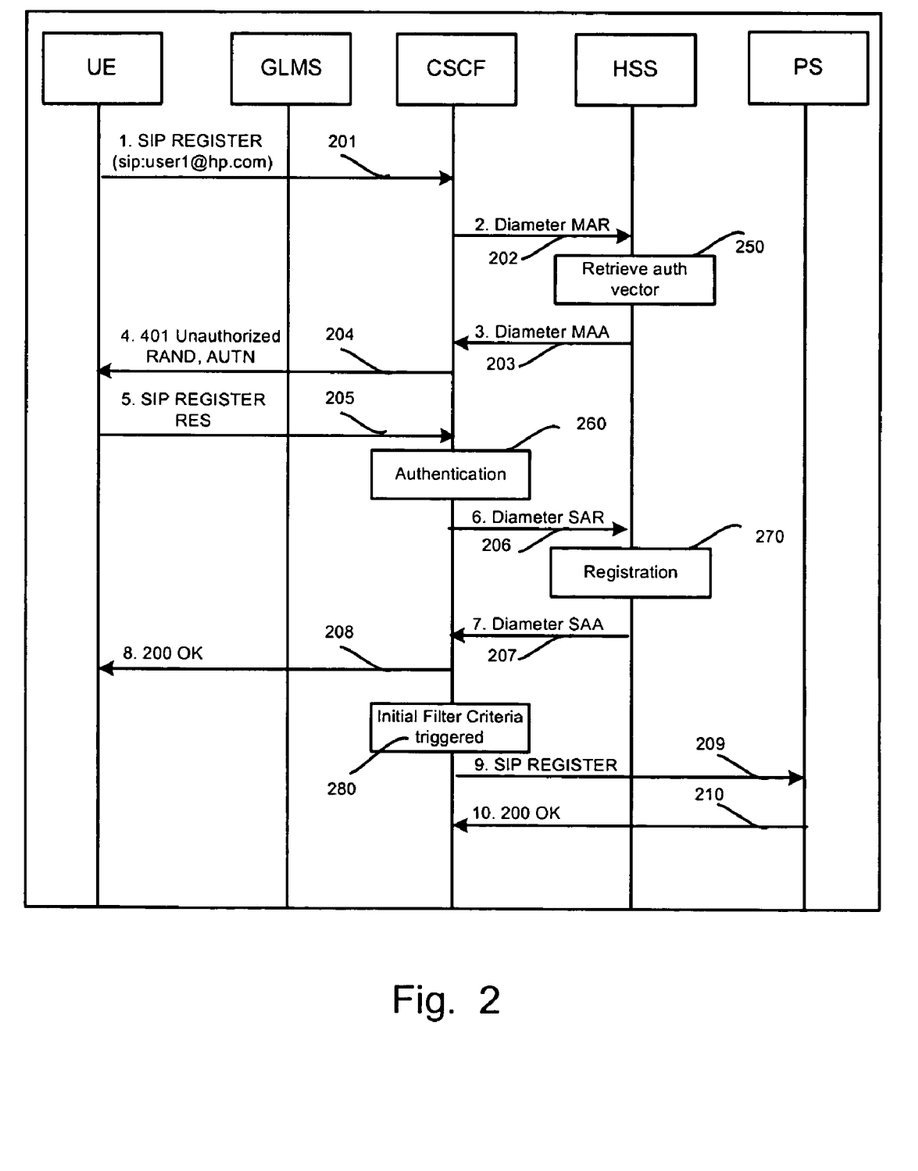
FIG. 2 is an example flow diagram showing the messages exchanged during user registration between the user's mobile device and the various network components.
Figure 3:
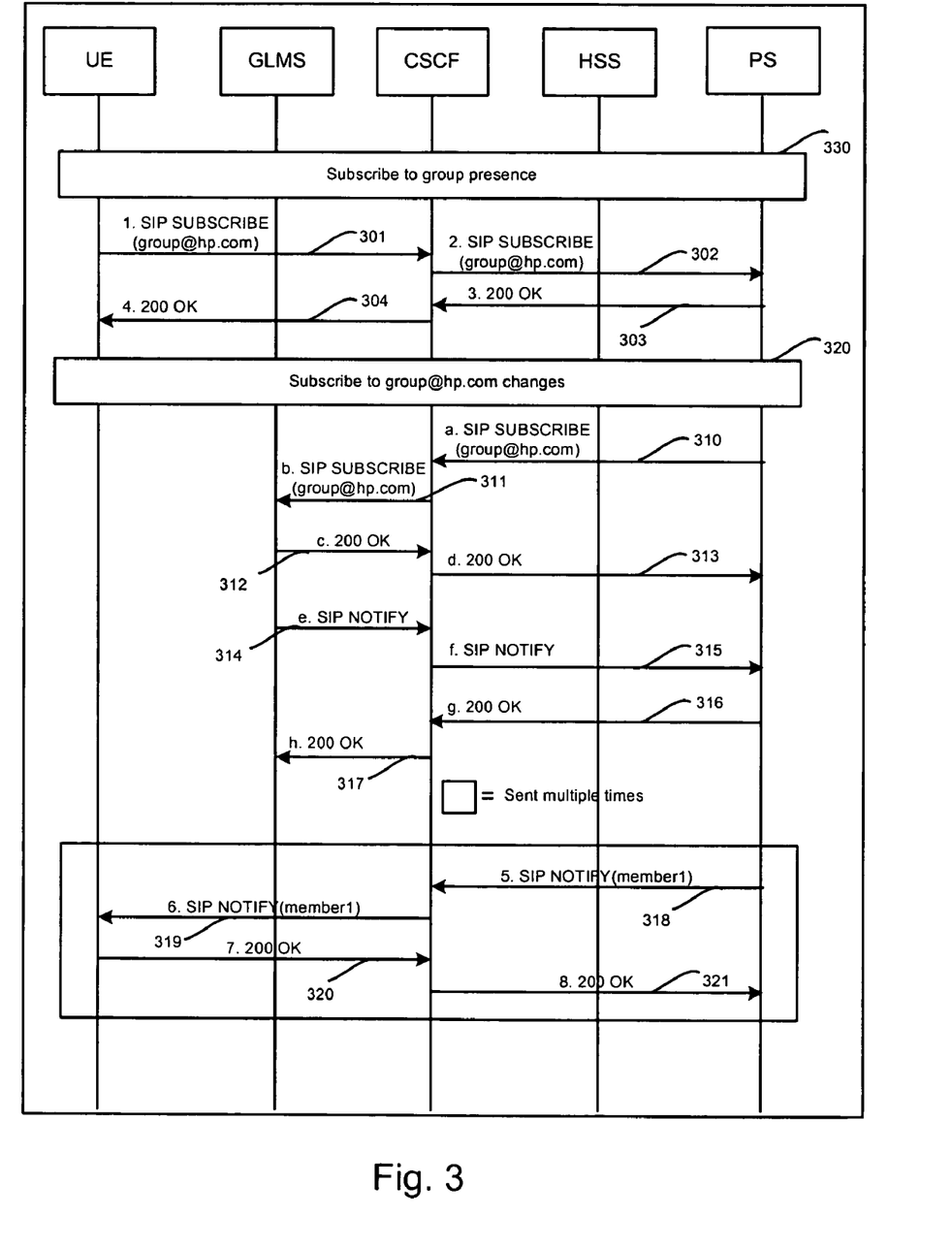
FIG. 3 shows the example messages involved when a user subscribes to receive group presence data.

The features and advantages of embodiments of the invention may be better understood with reference to the figures and discussions that follow. FIGS. 1-3 show the example flows that take place when a user creates a group with the Group List Management Server (GLMS) and subsequently subscribes to a group (whether created by that user or by another user) to be notified of changes to the group data and to be notified of the presence status of the group members. FIGS. 1-3 are conventional and are discussed herein in order to assist the reader in understanding subsequent figures that comprise embodiments of the invention. The details pertaining to the steps of FIGS. 1-3 are known to those skilled in the art and will not be discussed in great detail herein.

FIG. 1 is an example flow diagram showing the message flows that take place when a cell phone user sets up a group. In this example, the user's mobile equipment (UE or User Equipment in FIG. 1) employs the HTTP command Put, HTTP PUT(group.xml) in message 101 in order to instruct the GLMS to create a group from the file group.xml. The file group.xml pertains to a public group (i.e., one that can be seen and/or managed by users other than the user who sets up the group) and contains contact data for the group members. Note that the name "group" is only an example; the group and the xml file may have any suitable name. As employed herein, the terms user mobile equipment or mobile device include any mobile device (such as cellular phone, personal digital assistant, palm-top, laptop computers, etc.) that is capable of utilizing the wireless medium for data transmission.

In message 102, the GLMS may respond with a HTTP error code 401 if the user is not authorized to set up a list or if the user did not properly authenticate himself with the GLMS. The next pair of messages 102 and 103 show the situation wherein the user is properly authenticated and authorized to create a group with the GLMS using the HTTP put command (message 103). In this case, the GLMS accepts the command and the file group.xml to create the requested group. The GLMS responds with the HTTP message 201 Created (message 104).

The next pair of messages (105 and 106) show that the user may request that the GLMS create another group with a different name (i.e., friend.xml in message 105), and the GLMS responds when the group friend.xml is successfully created (HTTP 201 Created in message 106). In this example, the file friend.xml pertains to a private group (i.e., one that can be seen only by the user who sets up the group).

Step 110 and messages 111-118 show the step and messages exchanged between the user and the GLMS when the user logs on subsequently. Step 110 is a registration step, which happens when the user's cell phone is turned on. Registration step 110 is explained in greater detail in FIG. 2. Message 111 represents the message employed to obtain the group data from the GLMS pertaining to the private group created earlier from the file friend.xml. Once the group data is successfully transmitted to the mobile device, the GLMS confirms with message 112 (HTTP 200 OK). Messages 113 and 114 are an analogous message pair that retrieves the group data pertaining to the public group created earlier from the file group.xml In message 115, the user requests (via the message SIP SUBSCRIBE (group.xml)) that he wishes to subscribe to the changes to the membership data of the group, and such request is acknowledged by the GLMS via the HTTP message 200 OK (message 116). If there is a subsequent change to the membership data of the public group that is created from the file group.xml (e.g., one of the members has changed his email address), the GLMS notifies the user (via the message 117 SIP NOTIFY). The notify message is acknowledged by the mobile device in message 118, e.g., HTTP 200 OK.

FIG. 2 is an example flow diagram showing the messages exchanged during user registration between the user's mobile device and the various network components. The user's mobile device sends a request to register message 201 (SIP REGISTER (sip:user1@hp.com)) to register the user's mobile device with the network. In this case, the request is received by the interrogating CSCF. As is well known, a CSCF may have multiple parts, including the interrogating CSCF, the proxy CSCF, and the serving CSCF.

The interrogating CSCF then resolves the user's domain using the data supplied by the user's mobile device. Employing its own proxy, the serving CSCF then contacts the home subscriber server (HSS) associated with the user's domain to request an authentication token (via message 202 that request a diameter MAR or Multimedia—Auth-Request). The HSS then retrieves the authentication vectors (step 250) and returns the authentication vectors to the serving CSCF (via message 203, Diameter Multimedia—Auth-Answer or MAA).

Since the user's mobile device has yet to register with the network, the CSCF will inform the user's mobile device via message 204 (401 Unauthorized RAND AUTN) that the user is currently unauthorized and CSCF wishes to receive authentication tokens from the user's mobile device in order to compare them to the authentication vectors received from the HSS. In message 205, the user's mobile device responds with the requested authentication tokens (SIP Register RES).

The CSCF then compares the authentication tokens received from the HSS against the authentication tokens received from the user's mobile device to authenticate the user's mobile device in step 260. If the comparison is successful, the CSCF then sends in message 206 a Diameter SAR (Server-Assignment-Request) to the HSS to request to store the name of the serving CSCF.

The HSS stores the serving CSCF in the user's profile (block 270) and responds in message 207 with the updated user profile. The user profile includes information regarding the user's account, such as the user's public URI, the services subscribed, whether the user's account has been barred, and service trigger information (e.g., Presence Service triggers when SIP SUBSCRIBE message with event header set to presence). At this point, registration is complete and the CSCF acknowledges the completion of the registration task in message 208 (200 OK) to the requesting user's mobile device.

If the profile of the user includes a subscription to the presence server (PS) (ascertained in step 280), the CSCF then forwards the SIP REGISTER Message to the presence server (PS) in message 209. The PS then responds in flow 210 with an acknowledgement sent to the CSCF and records the availability of the user. This allows the presence server to provide presence data pertaining to the user's mobile device to other users.

FIG. 3 shows the example messages involved when a user subscribes to receive group presence data. In this case, since the group group@hp.com is a public group, the subscribing user may be any user, and not necessarily the user who created the group. Block 330 includes the messages 301-304 that are exchanged to enable the user to subscribe to the group presence. In message 301, the user's mobile device sends a SIP SUBSCRIBE (group@hp.com) to the CSCF interrogating part, with an event header set to presence. The request indicates that the user wishes to subscribe to receive presence information for members in the group identified by the URI (Uniform Resource Identifier) group@hp.com. The CSCF forwards the request to the presence server (PS) in message 302.

Since the requesting user is the original owner of the group in the present example, the PS will allow the user to subscribe (message 303), which is sent to the user via the CSCF (message 304).

At this point, the PS may obtain group members information and may subscribe to receive changes to the group information (block 320, which includes messages 310-321). First, the PS obtains the membership list. This membership list resides with the GLMS, where the user originally submitted the membership list (as discussed in connection with FIG. 1). Thus, the PS sends a SIP SUBSCRIBE (group@hp.com) to the CSCF (message 310), which then forwards the request to the GLMS (message 311). The GLMS acknowledges the request, which is sent back to the PS via the GLMS (messages 312 and 313). Subsequently, the GLMS sends the membership list of group@hp.com to the PS via the CSCF (using SIP NOTIFY messages 314 and 315, which may be sent multiple times to transfer data for all the members). Once the membership information is received, the PS acknowledges with a 200 OK message, which is forwarded to the GLMS via the CSCF (messages 316 and 317).

Once the PS has the membership information, it can send the presence data pertaining to the members to the subscribing user's mobile device. Thus, the PS sends the presence data pertaining to the members of group@hp.com to the subscribing user's mobile device (via SIP NOTIFY messages 318 and 319, which may be sent multiple times to cover all the members). The receipt of the presence data is acknowledged by the user's mobile device via 200 OK messages 320 and 321, which are sent to the PS via the CSCF. Messages 318-321 may be repeated since the membership information may change more than once until the subscription expires or the subscription is canceled.

Figure 4A:
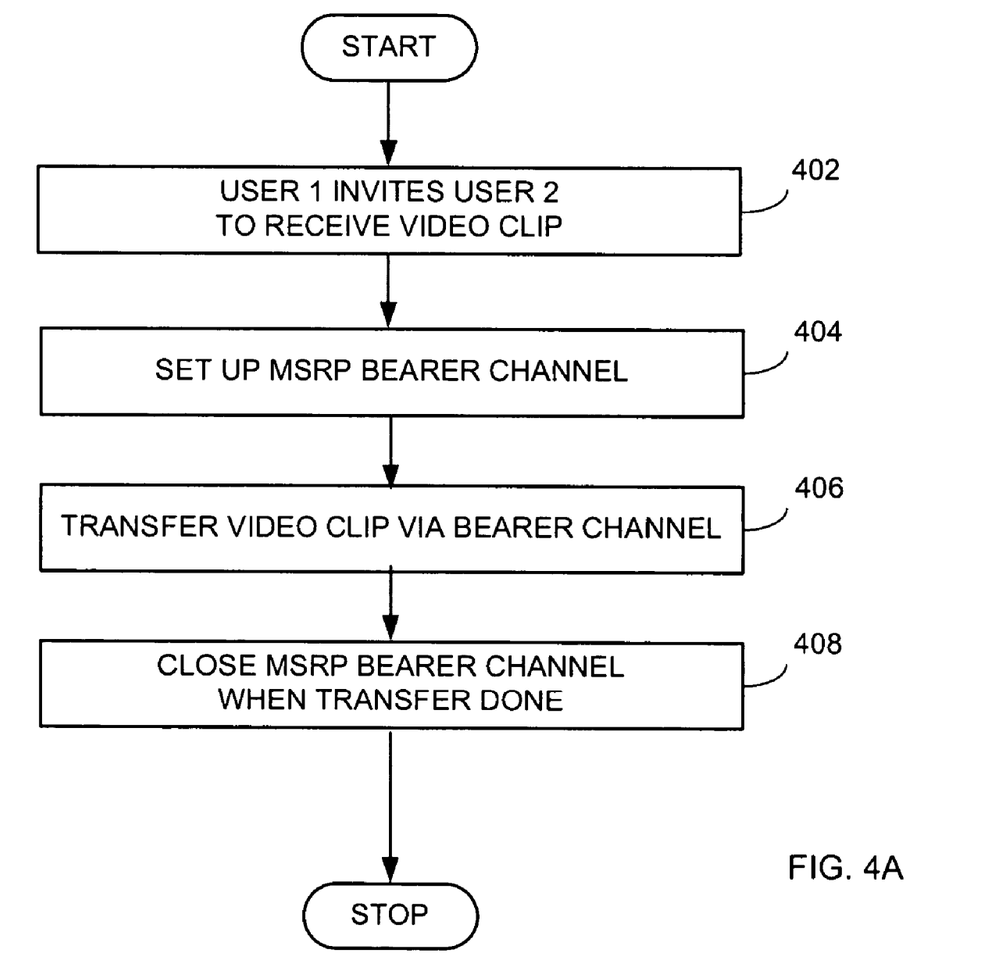
FIG. 4A shows, in accordance with an embodiment of the invention, the steps involved in sending a video clip from the user's mobile device to the recipient's video receiving equipment using MSRP.

FIG. 4A shows, in accordance with an embodiment of the invention, the steps involved in sending a video clip from the user's mobile device to the recipient's video receiving equipment (which may be another mobile device, a personal information manager, a laptop computer, or any computing device capable of receiving video) using MSRP. In step 402, user1 (e.g., the party wishing to send the video) invites user2 (e.g., the party that receives the video) to receive a video clip by sending an invite message from user1's mobile device to user2's UE (user equipment). In step 404, an MSRP bearer channel is set up to facilitate the transfer of the video data from user1 to user2 without having to incur processing overhead in the intermediate nodes (such as multiple CSCF hops, application servers, etc.) in the network. Once the MSRP bearer channel is set up, the video data is sent directly from user1 to user2 on this MSRP bearer channel (step 406). Once the video clip is completely transferred, the MSRP bearer channel is closed (step 408).

Figure 4B:
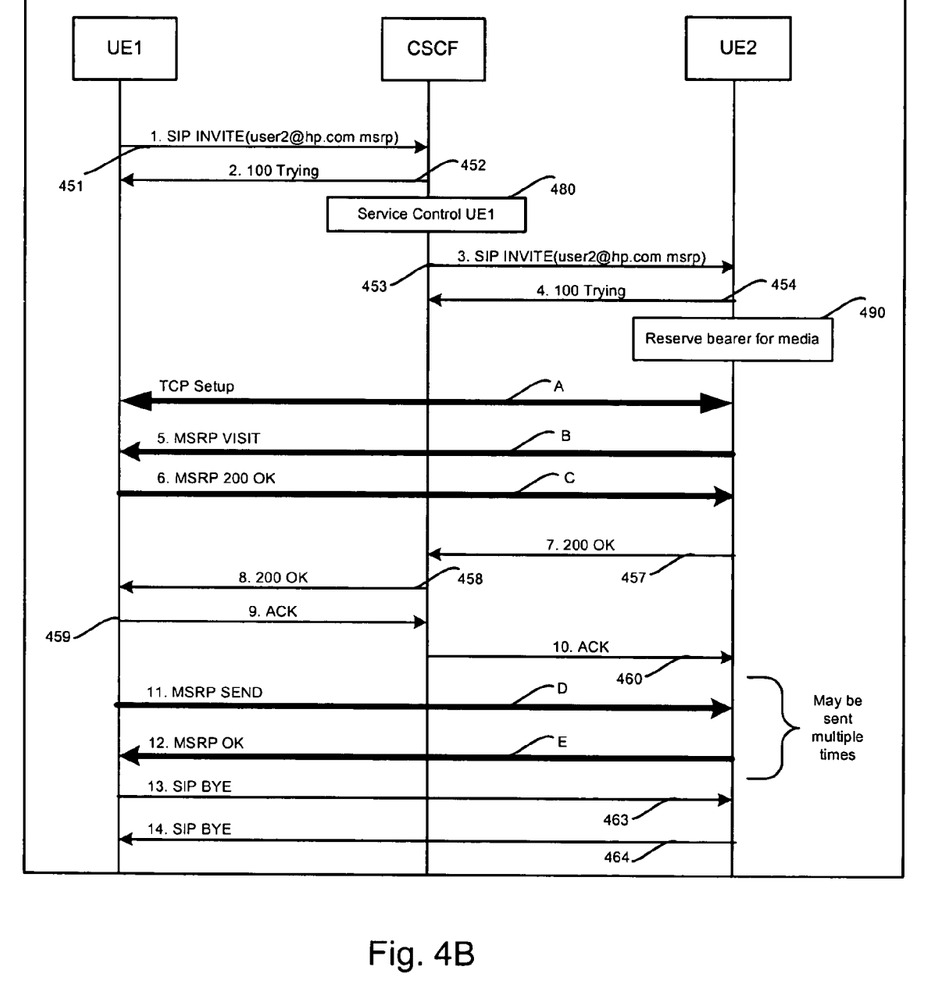
FIG. 4B illustrates, in accordance with an embodiment of the invention, an example flow diagram showing the messages exchanged when user1 wishes to transfer a video clip to user2 using an MSRP bearer channel.

FIG. 4B illustrates, in accordance with an embodiment of the invention, an example flow diagram showing the messages exchanged when user1 (shown as UE1 or user equipment 1 in FIG. 4B) wishes to transfer a video clip to user2 (shown as UE2 or user equipment 2 in FIG. 4B) using an MSRP bearer channel. In message 451, user1's mobile device sends a SIP INVITE (user2@hp.com msrp) to the CSCF to invite user2 to receive a video clip using an MSRP bearer data channel. The CSCF acknowledges the receipt of the request via message 452 (100 Trying), which indicates that the CSCF is in the process of forwarding the request to user2.

Prior to forwarding the video clip to user2's UE, the CSCF checks (block 480) on the service status of user2 to ascertain whether it is appropriate to forward the video clip to user2. For example, user2 may be delinquent in his payment for the network services, and his account may have been temporarily barred, rendering user2 ineligible for using the network in order to receive the video clip. As another example, user2 may have indicated in his profile that user2 does not wish to receive any video clip from user1 or from anyone. If it is deemed that user2 cannot receive the video clip, then user1 may be informed and the session is terminated.

On the other hand, if user2 is eligible to receive the video clip, CSCF then forwards the request from user1 (SIP INVITE (user2@hp.com msrp)) to user2's UE (message 453). User2's UE acknowledges the receipt of the request by sending a message 454 (100 Trying) to the CSCF.

At this point, user2's UE will attempt to set up (block 490) an MSRP bearer data channel to facilitate the video transfer. Using conventional TCP and MSRP set up procedures (arrow A, arrow B and arrow C), the MSRP bearer data channel is set up between user1's mobile device and user2's UE.

Once the MSRP data channel is set up, user2 sends a 200 OK message to user1, wherein the message is relayed through the CSCF (messages 457 and 458). The receipt of the okay message is acknowledged by user1's mobile device, which is sent to user2's UE via the CSCF (ACK messages 459 and 460).

At this point, the MSRP bearer data channel is created and the video transfer may begin (arrows D and E). In message 461, the video data is sent using MSRP from user1's mobile device to user2's UE (via the MSRP SEND message). User2's UE acknowledges using message 462 (MSRP OK). Note that the transfer of the video data is performed using the direct pipe between user1's mobile device and user2's UE. The, transfer may involve multiple cycles of MSRP SEND and MSRP OK messages to transfer all the video data.

Once the video clip transfer is completed, user1's mobile device informs user2's UE that it is terminating the connection. Thus user1's mobile device sends a SIP BYE message 463 to user2's UE. User2's UE acknowledges using message 200 OK (in message 464). At this point, the video clip is transferred and the MSRP bearer data channel is terminated.

Figure 5A:
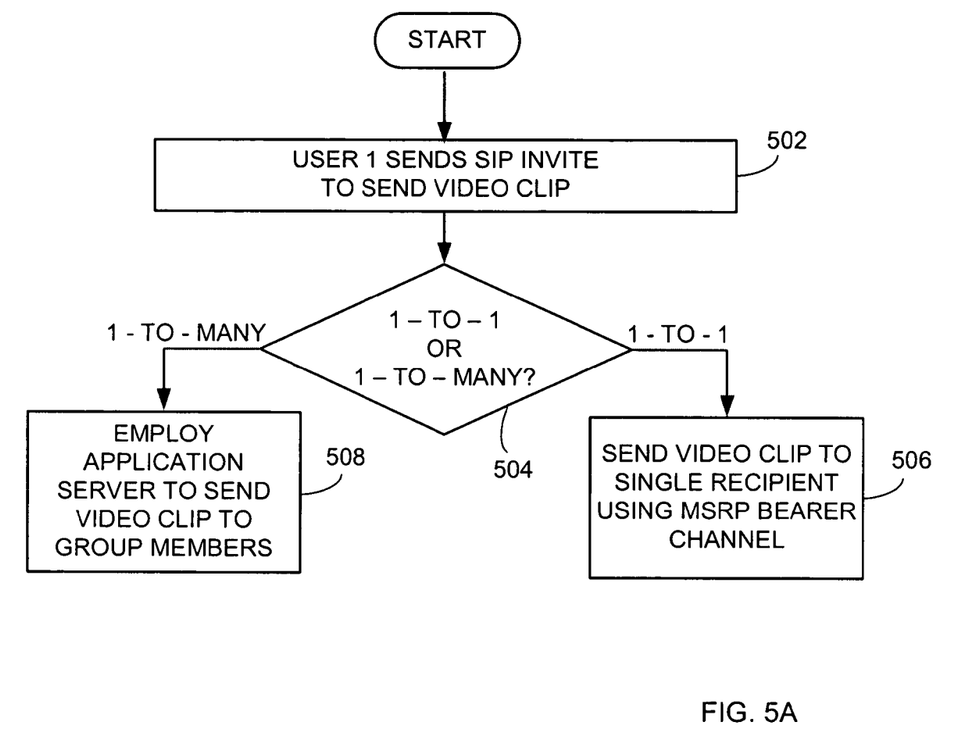
FIG. 5A shows, in accordance with an embodiment of the present invention, the steps for using an application server to accomplish one-to-many video transfer.

FIG. 5A shows, in accordance with an embodiment of the present invention, the steps for using an application server to accomplish one-to-many video transfer. User1 sends a SIP invite message to the CSCF (502). If the SIP Invite message indicates that the recipient is a single recipient (504), then the CSCF will initiate a 1-to-1 video transfer process (506) using, for example, the MSRP bearer data channel technique discussed in FIGS. 4A and 4B or by attaching a video clip in a SIP MESSAGE, as will be described later herein in connection with FIGS. 6A and 6B. On the other hand, if the SIP Invite message indicates that the recipient is a group (504), then the CSCF will route the SIP Invite message to the application server (AS) to enable the AS to send the video clip to the group members (508).

Figure 5B:
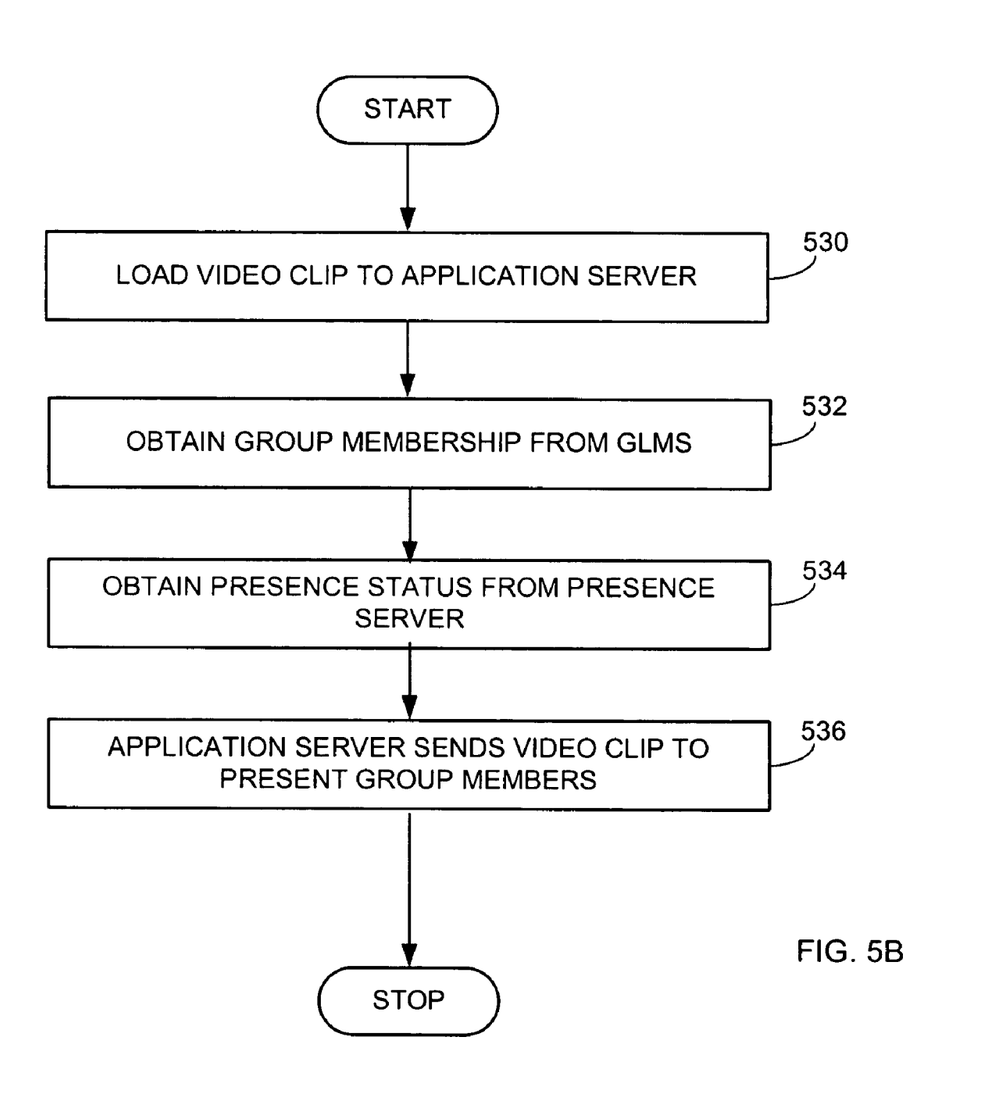
FIG. 5B shows in greater detail, in accordance with an embodiment of the present invention, the steps for using an application server to accomplish the one-to-many video transfer once the AS receives the forwarded SIP Invite message from user1.

FIG. 5B shows in greater detail, in accordance with an embodiment of the present invention, the steps for using an application server to accomplish the one-to-many video transfer once the AS receives the forwarded SIP Invite message from user1. Prior to employing the AS for the one-to-many video transfer, the video clip is first loaded onto the AS (530). In this case, user1 (the party sending the video) may perform the initial transfer of the video clip to the application server (AS) using, for example, an MSRP-based approach in the manner described in FIGS. 4A and 4B, substituting the AS for user2. If the video clip is fairly short, the initial transfer may also be performed using a SIP MESSAGE, as will be described later herein in connection with FIGS. 6A and 6B.

Once the initial video transfer to the AS is complete, the AS may begin performing the one-to-many transfer. In step 532, the AS obtains the list membership from the GLMS. In step 534, the AS then checks with the PS for the presence status of the group members. For members who are present, the AS sends (536) the video clip the recipient members using, for example, either the MSRP bearer data channel technique or the SIP message technique if the video clip is fairly short.

Figure 5C:
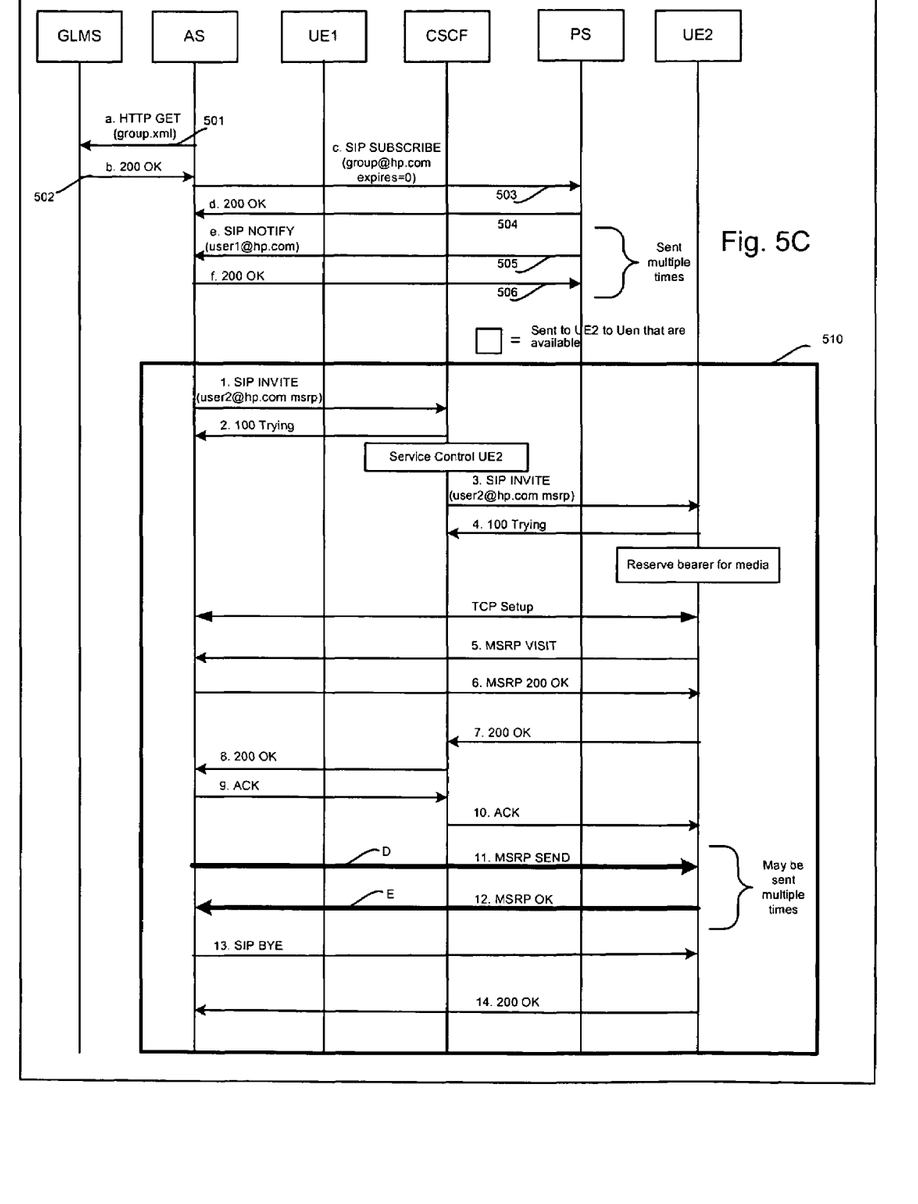
FIG. 5C illustrates, in accordance with an embodiment of the present invention, an example flow diagram showing the messages exchanged when user1 wishes to transfer a video clip to multiple members of a specified group using an application server.

FIG. 5C illustrates, in accordance with an embodiment of the present invention, an example flow diagram showing the messages exchanged when user1 wishes to transfer a video clip (which may be a large video clip, for example) to multiple members of a specified group using an application server. The user1 sends the video clip to the application server as in FIG. 4B, replacing the UE2 with the AS. In the example of FIG. 5C, a video clip is sent from the AS to the group members via MSRP bearer data channels. However, other video transfer techniques may also be employed in place of the MSRP, albeit with varying degree of efficiency.

Via message 501 (HTTP GET (group.xml), the AS first obtains the membership list of the group specified by user1 in the request to send video. In this example, the group is group@hp.com, which is kept at the GLMS in a group.xml list. The GLMS responds with message 502, furnishing the group membership to the AS.

Messages 503-506 are involved in ascertaining the presence status for the group members. Thus the AS sends (503) a SIP SUBSCRIBE (group@hp.com expires=0) to the PS, requesting the presence status of members of group@hp.com. The optional parameter "expires=0" sets the timer of the SUBSCRIBE message to be zero to indicate that the AS is only interested in obtaining the presence status once and is not interested in being notified if the presence status changes later. However, it is also possible to not set a timer or to set a timer to some other values so as to enable the AS to be notified of the presence status change. For example, the AS may wish to send the video clip at a later time when a member's presence status changes from "not present" to "present." The PS group list description is described in block 320.

The PS acknowledges the subscription message with a message 200 OK (504). The PS then obtains its presence data for the members of the group and sends the presence status to the AS. For user2, the PS sends (505) the presence status via the message SIP NOTIFY (user2@hp.com). The receipt of the SIP NOTIFY message for user2 is acknowledged by the message 200 OK (message 506). Messages 505 and 506 may be repeated for user3, user4 . . . userN of the group.

In block 510, the AS uses MSRP bearer data channels to send copies of the video clip from the AS to the members that are present. The messages involved in block 510 are substantially identical to the messages discussed in connection with FIGS. 4A and 4B, substituting the AS for user1 of FIGS. 4A and 4B. The video clips are sent one-by-one from the AS. However, the sending may be performed in parallel via multiple communication ports of the AS or may be sent sequentially. By using the AS to perform the actual video transfer to multiple recipients, the bandwidth requirement for the sender's mobile device is substantially reduced relative to the prior art. Further, this approach is highly scalable since multiple application servers may be employed to handle video transfers to a large number of recipients and/or to handle video transfers that involve large video clips.

Figure 6A:
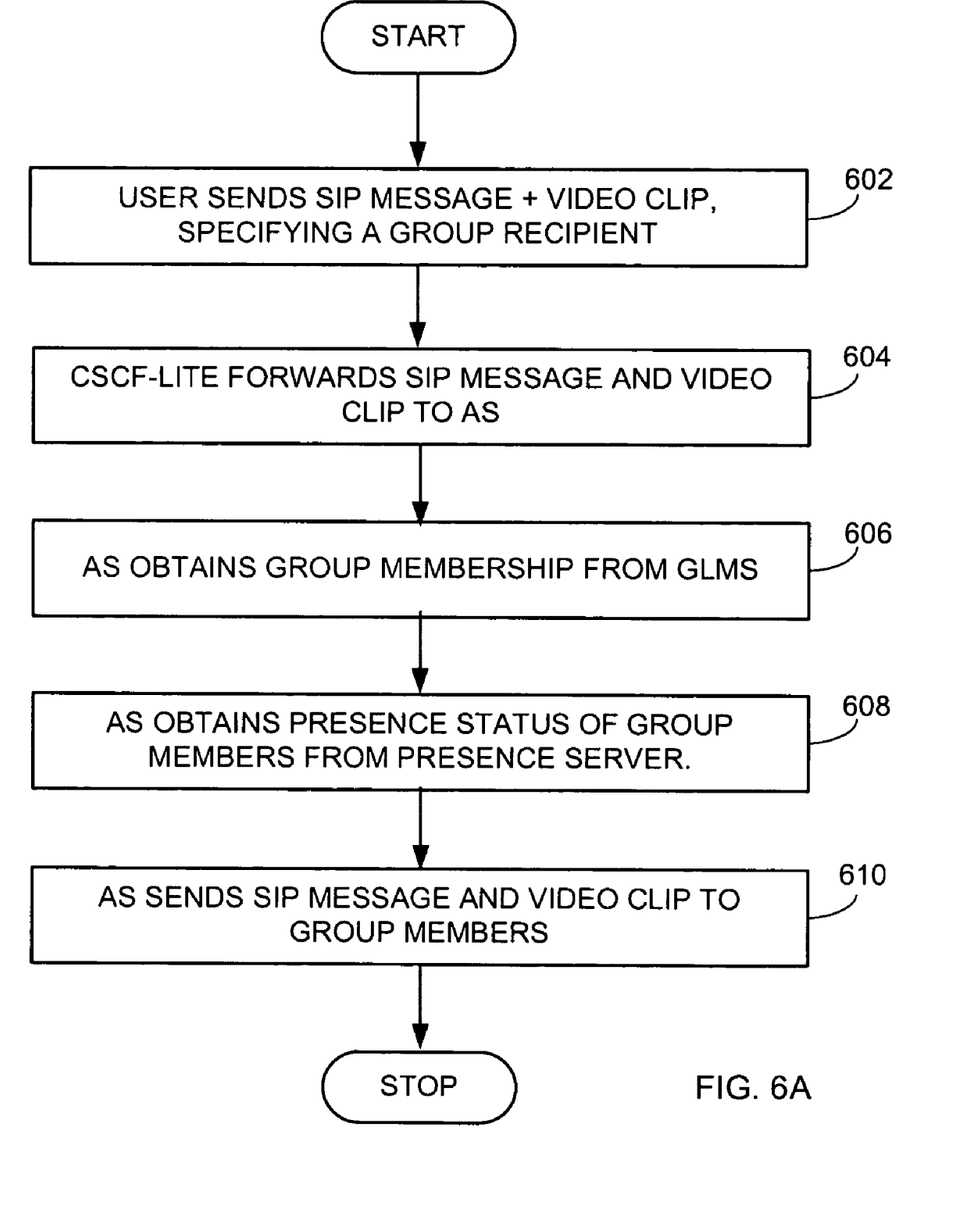
FIG. 6A shows, in accordance with an embodiment of the present invention, the steps for sending a video clip to a plurality of group members in a group using SIP messaging.

FIG. 6A shows, in accordance with an embodiment of the present invention, the steps for sending a video clip to a plurality of group members in a group using SIP messaging. Since SIP messaging is typically employed for sending IM (Instant Messaging) text, this technique is well suited for sending short video clips. In step 602, the user sends a SIP message that includes a video clip, specifying the group URI as the recipient. In step 604, the SIP message (including the video clip) is forwarded to the application server (AS) by the CSCF. The CSCF forwards the SIP message to the AS based on the trigger set in the user profile, e.g., group URI is not recognized but the URI contains a domain name destined for the AS (also known as Public Service Identifier or PSI lookup).

In step 606, the AS obtains the member information from the GLMS. This member information enables the AS to subsequently forward copies of the video clip to the members of the group. In step 608, the AS obtains the presence status for the group members. In step 610, the AS sends the SIP message, including the video clip, to the group members one-by-one (either parallelly or serially).

Figure 6B:
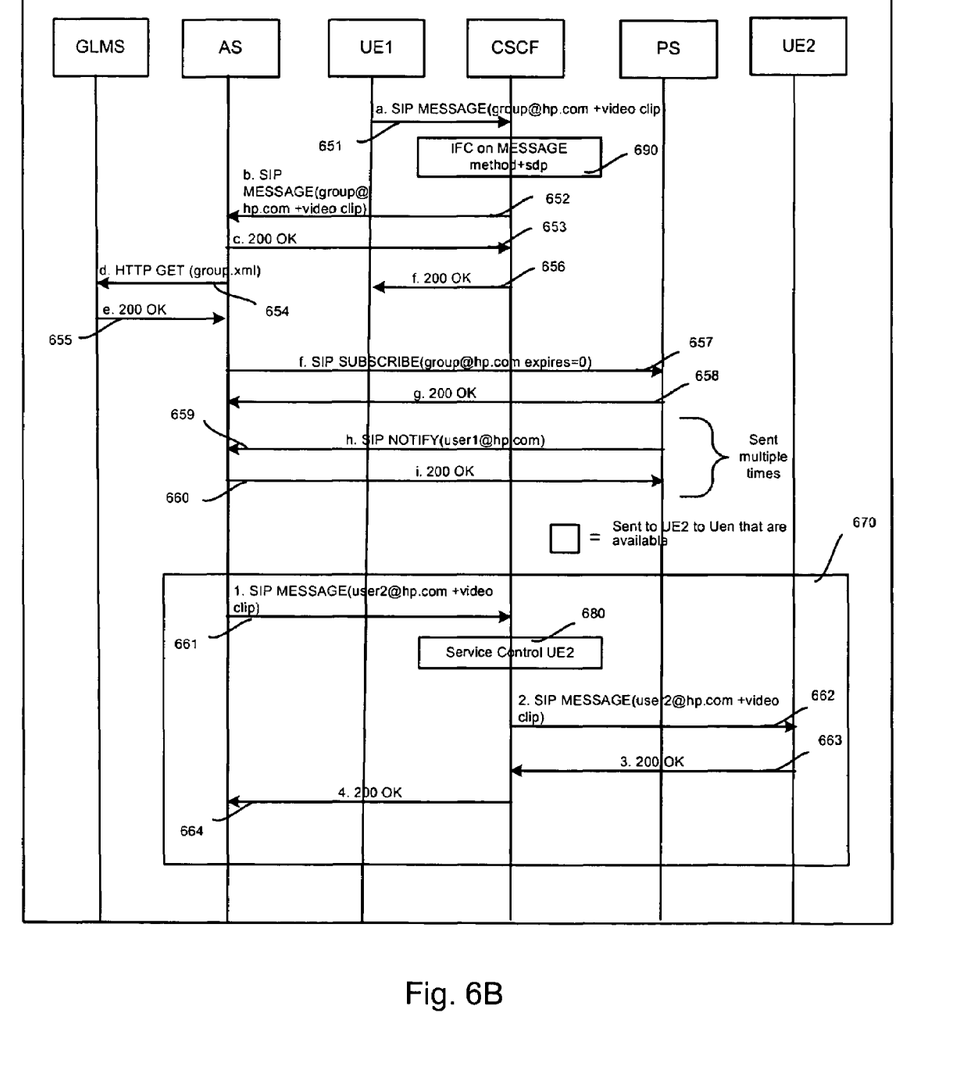
FIG. 6B shows, in accordance with an embodiment of the present invention, an example flow diagram showing the messages exchanged when user1 wishes to transfer a video clip to multiple members of a specified group using an application server.

FIG. 6B shows, in accordance with an embodiment of the present invention, an example flow diagram showing the messages exchanged when user1 wishes to transfer a video clip to multiple members of a specified group using an application server. In the example of FIG. 6B, the video clip is sent from the AS to the group members via SIP messaging. Via message 651, the mobile device associated with user1 (the sender) sends a SIP MESSAGE (group@hp.com+video clip) to the CSCF. This SIP message includes the video clip and specifies group@hp.com as the recipient. The CSCF does not recognize the group URI and did a PSI lookup using the group URI's domain name. In message 652, the CSCF forwards the SIP message, including the video clip, to the AS to enable the AS to forward copies of the video clip to the group members. The receipt of the SIP message is acknowledged by the AS to the CSCF via message 653 (200 OK).

Via message 654 (HTTP GET (group.xml), the AS first obtains the membership list of the group specified by user1 in the SIP request to send video. In this example, the group is group@hp.com, which is kept at the GLMS in a group.xml list. The GLMS responds with message 655, furnishing the group membership to the AS. During this time, the CSCF acknowledges the receipt of the SIP message to user 1 via message 656 (200 OK).

Messages 657-660 are involved in ascertaining the presence status for the group members. Thus the AS sends (657) a SIP SUBSCRIBE (group@hp.com expires=0) to the PS, requesting the presence status of members of group@hp.com. The optional parameter "expires=0" sets the timer of the SUBSCRIBE message to be zero to indicate that the AS is only interested in the presence status once and not interested in being notified if the presence status changes later. However, it is also possible to not set a timer or to set a timer to some other values so that the AS can be notified of the presence status change. The group list subscription is described in block 320.

The PS acknowledges the subscription message with a message 200 OK (658). The PS then obtains its presence data for the members of the group and sends the presence status to the AS. For user2, the PS sends (659) the presence status via the message SIP NOTIFY (user2@hp.com). The receipt of the SIP NOTIFY message for user2 is acknowledged by the message 200 OK (message 660). Messages 659 and 660 may be repeated for user3, user4 . . . userN of the group.

In block 670, the AS uses SIP messaging to send the video clip from the AS to the members that are present. Thus, via message 661, the AS sends the SIP message, including the video clip, with a specified recipient data (SIP Message (user2@hp.com+video clip)), to the CSCF, which facilitates the forwarding of the video clip to the specified recipient.

In block 680, the CSCF performs service control on the specified recipient (user2 in this example). In performing the service control, the CSCF checks on the service status of user2 to ascertain whether it is appropriate to forward the video clip to user2. For example, user2 may be delinquent in his payment for the network services, and his account may have been temporarily barred, rendering user2 ineligible for using the network in order to receive the video clip. As another example, user2 may have indicated in his profile that user2 does not wish to receive any video clip from user1 or from anyone. If it is deemed that user2 cannot receive the video clip, then user1 may be informed and the session is terminated.

On the other hand, if user2 is eligible to receive the video clip, CSCF then forwards the request from user1 (SIP Message (user2@hp.com+video clip)) to user2's UE (message 662). User2's UE acknowledges the receipt of the video clip by sending a message 663 (200 OK) to the CSCF. The CSCF in turn informs the AS that the video clip has been forwarded to user2 via message 664 (200 OK).

Figure 7:
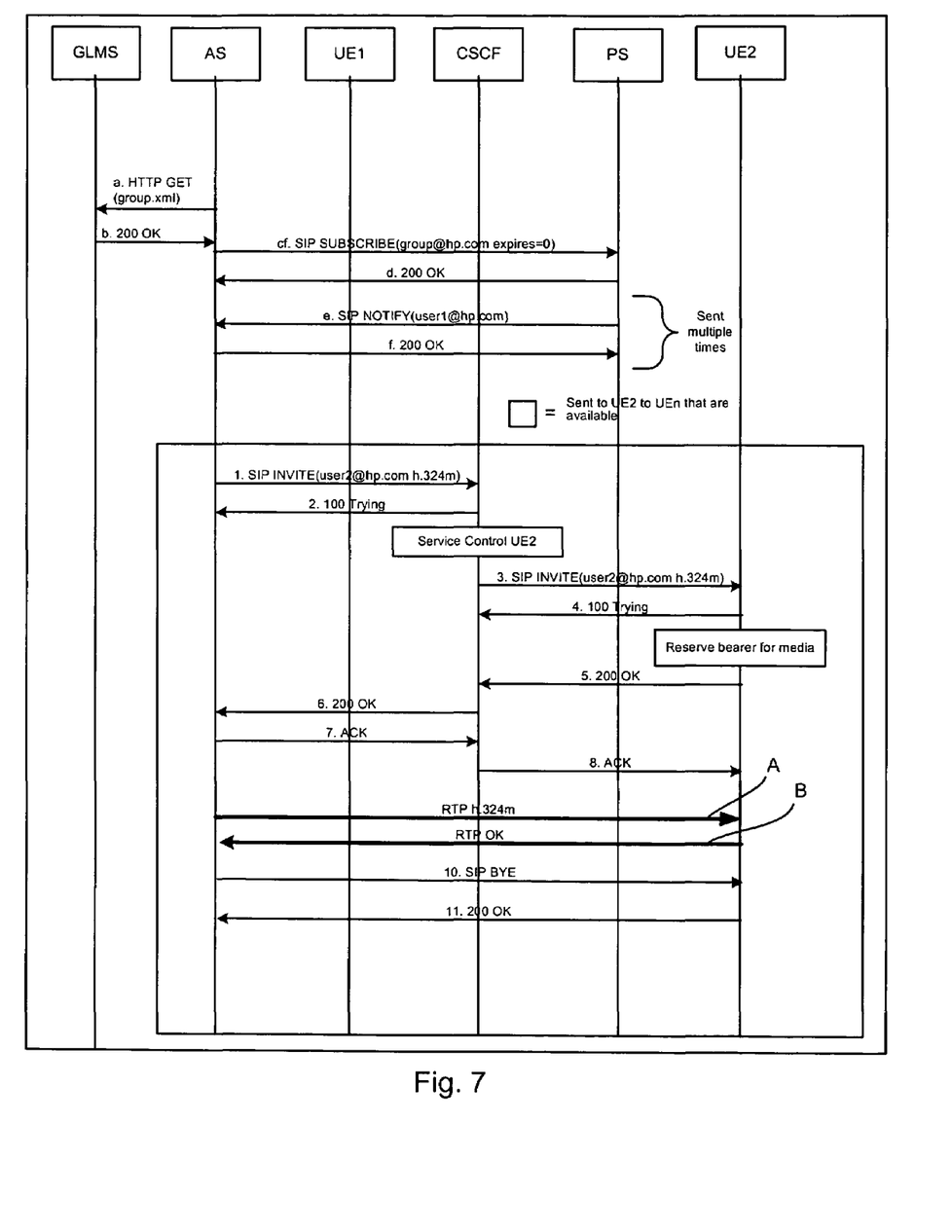
FIG. 7 illustrates, in accordance with an embodiment of the present invention, an example flow diagram showing the messages exchanged when user1 wishes to transfer a video clip to multiple members of a specified group using an application server.

FIG. 7 illustrates, in accordance with an embodiment of the present invention, an example flow diagram showing the messages exchanged when user1 wishes to transfer a video clip to multiple members of a specified group using an application server. In the example of FIG. 7, the video clip is sent from the AS to the group members using Real-time Transfer Protocol (RTP) instead of MSRP (as is done in FIG. 5C). The messages of FIG. 7 are substantially identical to those of FIG. 5C except that the video transfer between the AS and each recipient employs RTP instead of MSRP. Thus, instead of the MSRP communication channels (reference numbers D and E in FIG. 5C, the AS transfers the video clip to each recipient's UE using RTP (reference numbers A and B in FIG. 7).

While this invention has been described in terms of several embodiments, there are alterations, permutations, and equivalents which fall within the scope of this invention. As discussed, although the examples refer to the sending of a video clip consistently to ease understanding, embodiments of the invention apply to other types of multimedia data as well. Further, there are many alternative ways of implementing the apparatuses of the present invention. It is therefore intended that the following appended claims be interpreted as including all such alterations, permutations, and equivalents as fall within the true spirit and scope of the present invention.

What is claimed is:

1. A method for transferring a multimedia file from a user's mobile device to user equipment associated with another user, comprising:

sending an invitation from said user's mobile device through a Call Session Control Function (CSCF) facility to said user equipment to request a transfer of said multimedia file;

setting up a bearer data channel between said user's mobile device and said equipment to facilitate said transferring of said multimedia file, said transferring is configured to be accomplished using Message Sessions Relay Protocol (MRSP);

transferring said multimedia file using said MSRP and said bearer data channel directly from said user's mobile device to said user equipment, wherein said transferring said multimedia file using said MSRP is invoked by the CSCF facility when said invitation indicates a recipient is a single recipient; and invoking by the CSCF facility routing of said invitation message to an application server to enable said application server to send said multimedia file to group members when said invitation indicates the recipient is a group.

2. The method of claim 1 wherein said multimedia file is a video file.

3. The method of claim 1 wherein said invitation is performed using SIP (Session Initiation Protocol).

4. The method of claim 1 wherein said setting up includes setting up using an HTTP (Hypertext Transfer Protocol) command.

5. The method of claim 1 wherein said user's mobile device is a cellular phone.

6. The method of claim 1 wherein said user's mobile device is a portable computing device.

7. The method of claim 1 wherein said user's mobile device is a personal information manager (PIM) device.

* * * * *

UNITED STATES PATENT AND TRADEMARK OFFICE
CERTIFICATE OF CORRECTION

PATENT NO. : 7,529,813 B2  Page 1 of 1
APPLICATION NO. : 11/107140
DATED : May 5, 2009
INVENTOR(S) : Sharon Lim et al.

It is certified that error appears in the above-identified patent and that said Letters Patent is hereby corrected as shown below:

Title page, Item (54), "Title", delete "NETWORK" and insert -- NETWORKS --, therefor.

In column 1, line 2, delete "NETWORK" and insert -- NETWORKS --, therefor.

Signed and Sealed this

Nineteenth Day of January, 2010

David J. Kappos
*Director of the United States Patent and Trademark Office*